United States Patent
Clum et al.

(10) Patent No.: US 10,233,842 B2
(45) Date of Patent: Mar. 19, 2019

(54) TANGENTIAL ON-BOARD INJECTORS FOR GAS TURBINE ENGINES

(71) Applicant: United Technologies Corporation, Farmington, CT (US)

(72) Inventors: Carey Clum, East Hartford, CT (US); Thomas N. Slavens, Moodus, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 533 days.

(21) Appl. No.: 14/991,064

(22) Filed: Jan. 8, 2016

(65) Prior Publication Data
US 2017/0198636 A1    Jul. 13, 2017

(51) Int. Cl.
F01D 5/08 (2006.01)
F01D 25/12 (2006.01)
F02C 7/18 (2006.01)

(52) U.S. Cl.
CPC ............... *F02C 7/18* (2013.01); *F01D 5/081* (2013.01); *F01D 5/082* (2013.01); *F01D 25/12* (2013.01); *F05D 2220/32* (2013.01); *F05D 2230/00* (2013.01); *F05D 2230/60* (2013.01); *F05D 2260/20* (2013.01); *Y02T 50/676* (2013.01)

(58) Field of Classification Search
CPC .......... F01D 5/081; F01D 5/082; F01D 25/12; F02C 7/18; F02C 7/125
See application file for complete search history.

(56) References Cited

U.S. PATENT DOCUMENTS

| 4,447,190 A * | 5/1984 | Campbell | F01D 5/08 415/110 |
| 5,207,558 A * | 5/1993 | Hagle | F01D 5/148 415/12 |
| 6,969,237 B2 * | 11/2005 | Hudson | F01D 5/081 416/231 B |
| 8,578,720 B2 * | 11/2013 | Ebert | F01D 5/081 415/115 |
| 2008/0141677 A1 * | 6/2008 | Brillert | F01D 5/081 60/785 |
| 2011/0072832 A1 | 3/2011 | Blanchard et al. | |

FOREIGN PATENT DOCUMENTS

| EP | 0768448 | 4/1997 |
| EP | 1510659 | 3/2005 |
| GB | 2111598 | 7/1983 |

OTHER PUBLICATIONS

Uropean Search Report, European Application No. 16194303.0, dated Jun. 2, 2017, European Patent Office; European Search Report 8 pages.

* cited by examiner

*Primary Examiner* — Ninh H Nguyen
*Assistant Examiner* — Brian P Wolcott
(74) *Attorney, Agent, or Firm* — Cantor Colburn LLP

(57) ABSTRACT

A tangential on-board injector (TOBI) for a gas turbine engine and methods of making the same are provided. The TOBI includes at least one adjustable strut configured to control an airflow through the TOBI, the at least one adjustable strut moveable to change an airflow characteristic within the TOBI.

18 Claims, 5 Drawing Sheets

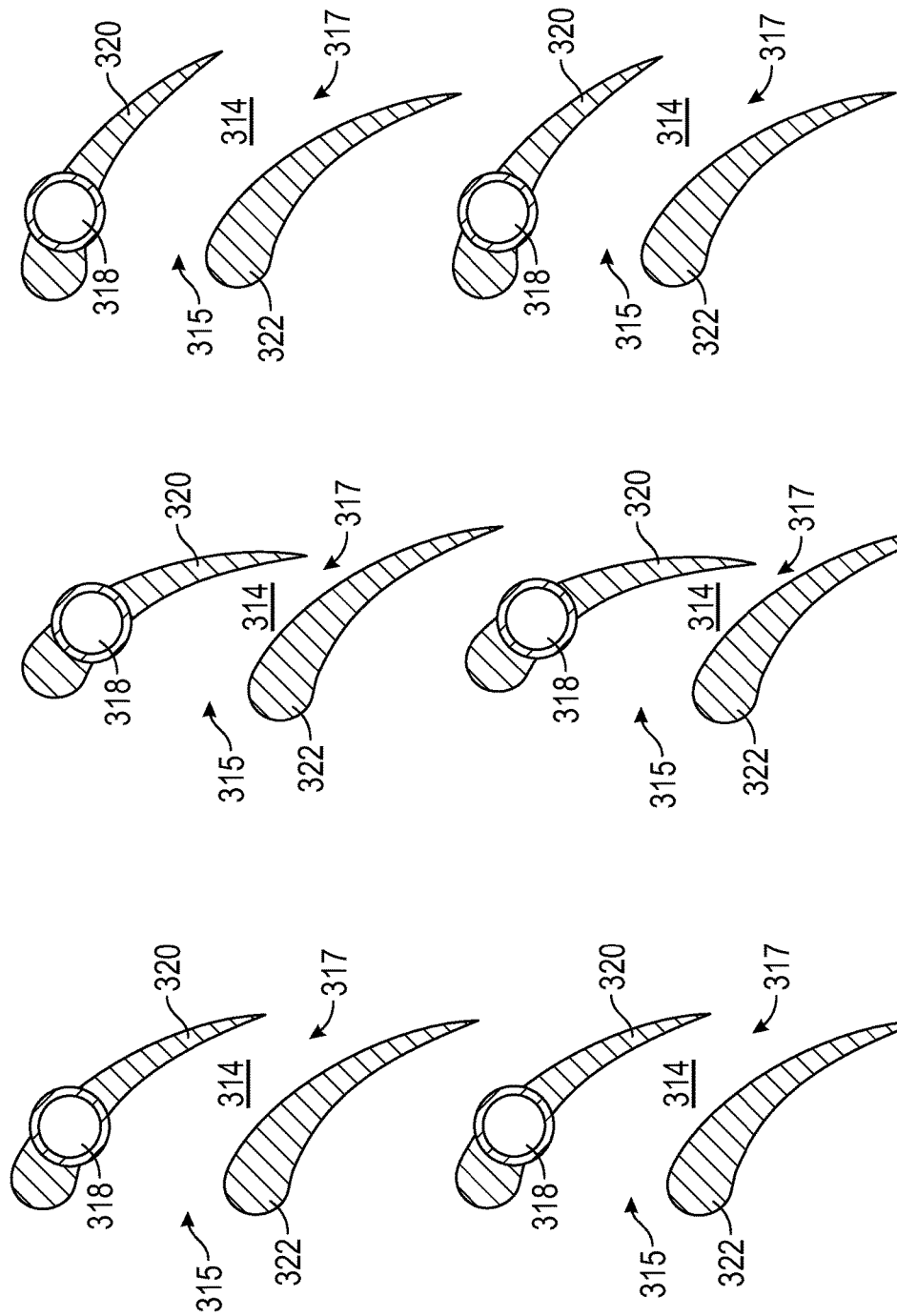

TANGENTIAL ON-BOARD INJECTORS FOR GAS TURBINE ENGINES

STATEMENT REGARDING FEDERALLY SPONSORED RESEARCH OR DEVELOPMENT

This invention was made with government support under Contract No. N00014-09-D-0821-0006 awarded by the United States Navy. The government has certain rights in the invention.

BACKGROUND

The subject matter disclosed herein generally relates to gas turbine engines and, more particularly, to tangential on-board injectors (TOBI).

Variable Area Turbines (VATs) are an adaptive component which, when coupled with other adaptive engine features such as adaptive fans, compressors with variable vanes, variable nozzles, etc. can yield significant benefits in overall gas turbine engine performance. Such benefits may include but are not limited to reduced specific fuel consumption (SFC), reduced High Pressure Compressor (HPC) discharge air temperature (T3) at take-off conditions, improved throttle response, and improved part life. A VATs function is to provide a change in turbine flow parameter (i.e., HPT flow parameter is defined as FP4, LPT flow parameter is defined as FP45). To achieve the change in flow parameter one solution is to change a turbine flow area. As the main turbine flow area meter, varying the first stage turbine vane area in any given turbine provides a prime means for varying turbine flow parameter. Varying turbine vane area may be achieved in various ways including rotating a plurality of the individual vane airfoils in the first stage in any given turbine.

Utilizing rotating turbine vanes to adjust engine by-pass ratio may affect a flow swirl angle to downstream components. The actuation of the rotating vanes alters the inlet angle to the downstream rotor row altering the stagnation location from positive incidence (pressure side stagnation location), neutral incidence (leading edge stagnation location), to negative incidence (suction side stagnation location). This also affects the RPM of first and second blades within the gas turbine engine. In current configurations, the blades may be cooled by cooling air and that cooling air is delivered by a tangential on-board injector (TOBI) that turns the air so that the loss coming on board is minimal. Normally the air is turned in such a way that the incoming velocity is close to that of the blade itself.

SUMMARY

According to one embodiment, a tangential on-board injector (TOBI) for a gas turbine engine is provided. The TOBI includes at least one adjustable strut configured to control an airflow through the TOBI, the at least one adjustable strut moveable to change an airflow characteristic within the TOBI.

In addition to one or more of the features described above, or as an alternative, further embodiments of the TOBI may include that the at least one adjustable strut comprises a body and at least one pivot, wherein the body is configured to rotate about the at least one pivot.

In addition to one or more of the features described above, or as an alternative, further embodiments of the TOBI may include that the at least one adjustable strut comprises a body defining a fixed portion and at least one flap portion, wherein the at least one flap portion is moveable relative to the body.

In addition to one or more of the features described above, or as an alternative, further embodiments of the TOBI may include that the at least one flap portion is moveable on a hinge.

In addition to one or more of the features described above, or as an alternative, further embodiments of the TOBI may include that the body has a suction side and a pressure side, wherein the at least one flap portion is located on the pressure side of the body.

In addition to one or more of the features described above, or as an alternative, further embodiments of the TOBI may include that the body has a suction side and a pressure side, wherein the at least one flap portion is located on the suction side of the body.

In addition to one or more of the features described above, or as an alternative, further embodiments of the TOBI may include that the at least one flap portion comprising at least two flap portions.

In addition to one or more of the features described above, or as an alternative, further embodiments of the TOBI may include that the at least two flap portions are configured to move independently of each other.

In addition to one or more of the features described above, or as an alternative, further embodiments of the TOBI may include that the at least one adjustable strut is operably connected to a vane of the gas turbine engine, wherein operation of the operably connected vane causes adjustment of the at least one adjustable strut.

According to another embodiment, a gas turbine engine is provided. The gas turbine engine includes a tangential on-board injector (TOBI) having at least one adjustable strut configured to control an airflow through the TOBI, the at least one adjustable strut moveable to change an airflow characteristic within the TOBI.

In addition to one or more of the features described above, or as an alternative, further embodiments of the gas turbine engine may include that the at least one adjustable strut comprises a body and at least one pivot, wherein the body is configured to rotate about the at least one pivot.

In addition to one or more of the features described above, or as an alternative, further embodiments of the gas turbine engine may include that the at least one adjustable strut comprises a body defining a fixed portion and at least one flap portion, wherein the at least one flap portion is moveable relative to the body.

In addition to one or more of the features described above, or as an alternative, further embodiments of the gas turbine engine may include that the at least one flap portion is moveable on a hinge.

In addition to one or more of the features described above, or as an alternative, further embodiments of the gas turbine engine may include that the body has a suction side and a pressure side, wherein the at least one flap portion is located on the pressure side of the body.

In addition to one or more of the features described above, or as an alternative, further embodiments of the gas turbine engine may include that the body has a suction side and a pressure side, wherein the at least one flap portion is located on the suction side of the body.

In addition to one or more of the features described above, or as an alternative, further embodiments of the gas turbine engine may include that the at least one flap portion comprising at least two flap portions.

In addition to one or more of the features described above, or as an alternative, further embodiments of the gas turbine engine may include that the at least two flap portions are configured to move independently of each other.

In addition to one or more of the features described above, or as an alternative, further embodiments of the gas turbine engine may include that the at least one adjustable strut is operably connected to a vane of the gas turbine engine, wherein operation of the operably connected vane causes adjustment of the at least one adjustable strut.

In addition to one or more of the features described above, or as an alternative, further embodiments of the gas turbine engine may include that the TOBI comprises a plurality of adjustable struts, the plurality of adjustable struts configured to alternate within the TOBI with a plurality of stationary struts.

According to another embodiment, a method of manufacturing a gas turbine engine having a tangential on-board injector is provided. The method includes forming at least one adjustable strut configured to control an airflow through the TOBI, the at least one adjustable strut moveable to change an airflow volume within the TOBI.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be illustrative and explanatory in nature and non-limiting.

BRIEF DESCRIPTION OF THE DRAWINGS

The subject matter is particularly pointed out and distinctly claimed at the conclusion of the specification. The foregoing and other features, and advantages of the present disclosure are apparent from the following detailed description taken in conjunction with the accompanying drawings in which:

FIG. 3A is a schematic view of a plurality of struts of a TOBI in accordance with an embodiment of the present disclosure, the struts in a neutral position;

FIG. 3B is a schematic view of the struts of FIG. 3A in a closed position;

FIG. 3C is a schematic view of the struts of FIG. 3A in an open position;

DETAILED DESCRIPTION

Figure 1A:
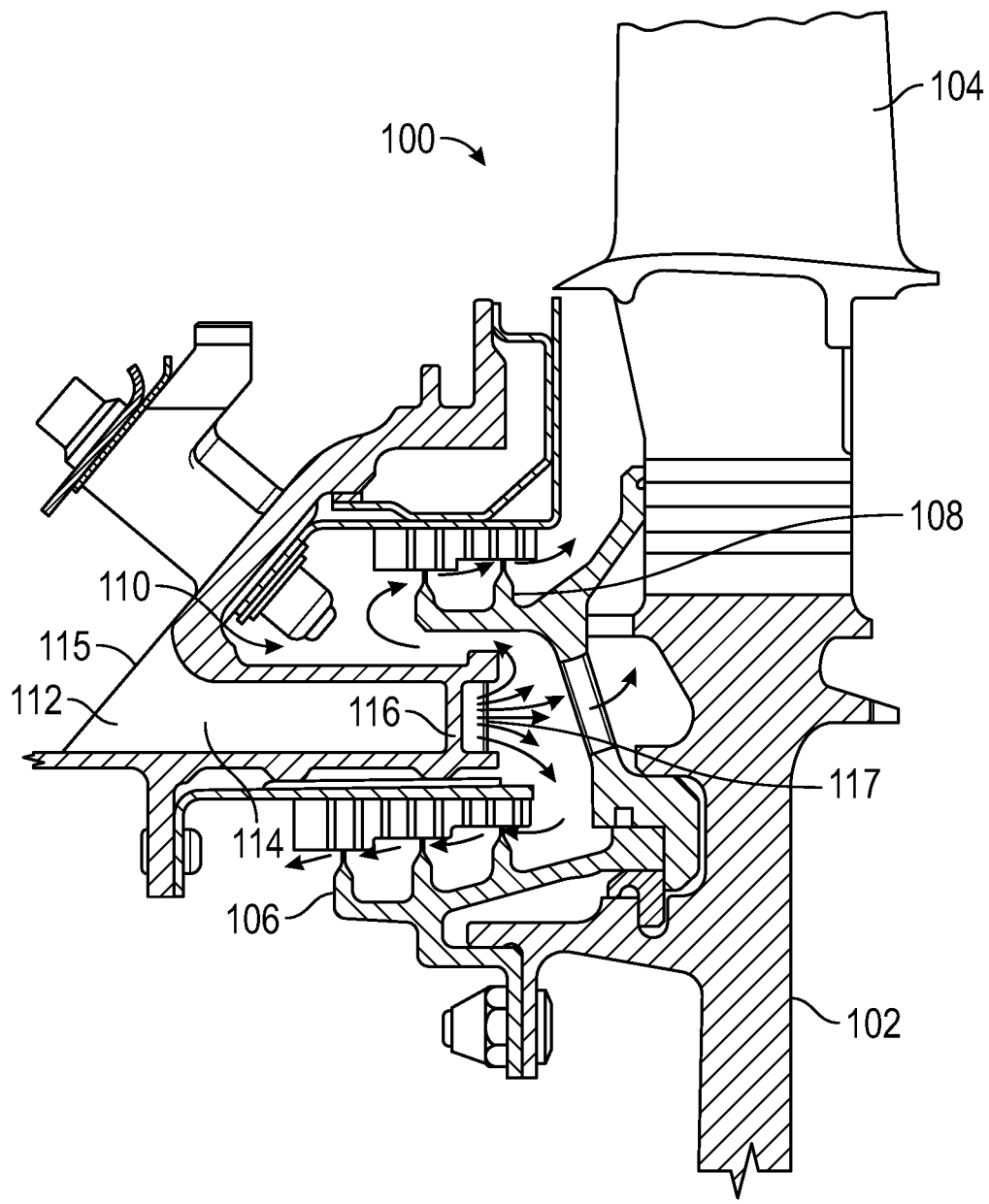
FIG. 1A is a schematic illustration of a portion of a gas turbine engine having a tangential on-board injector ("TOBI") that may employ one or more embodiments described herein.

As shown and described herein, various features of the disclosure will be presented. Various embodiments may have the same or similar features and thus the same or similar features may be labeled with the same reference numeral, but preceded by a different first number indicating the figure to which the feature is shown. Thus, for example, element "a" that is shown in FIG. X may be labeled "Xa" and a similar feature in FIG. Z may be labeled "Za." Although similar reference numbers may be used in a generic sense, various embodiments will be described and various features may include changes, alterations, modifications, etc. as will be appreciated by those of skill in the art, whether explicitly described or otherwise would be appreciated by those of skill in the art.

FIG. 1A is a schematic illustration of a portion of a gas turbine engine having a tangential on-board injector ("TOBI"). During operation, air discharging from the TOBI is delivered into a cavity just ahead of the turbine. The cavity is typically sealed off by one or more seals that interface between the rotating and non-rotating structure of the gas turbine engine. Air may escape or pass through the one or more seals in the form of leakage.

The arrows in FIG. 1A illustrate a cooling air flow discharging from the TOBI and distributed around and through a turbine portion of the gas turbine engine. As shown, a turbine 100 (partially shown) comprises a disk 102 supporting a plurality of circumferentially spaced blades 104 (one being shown). A first seal 106 and a second seal 108 are configured to define an annular cavity 110 just ahead of the turbine 100. A body 112 of a TOBI defines an annular passageway 114 that is configured to receive compressor discharge air and deliver it to the turbine rotor through a plurality of nozzles 116. The body 112 has an entrance 115 and an exit 117, with the nozzles 116 configured at the exit 117 of the body 112.

Figure 1C:
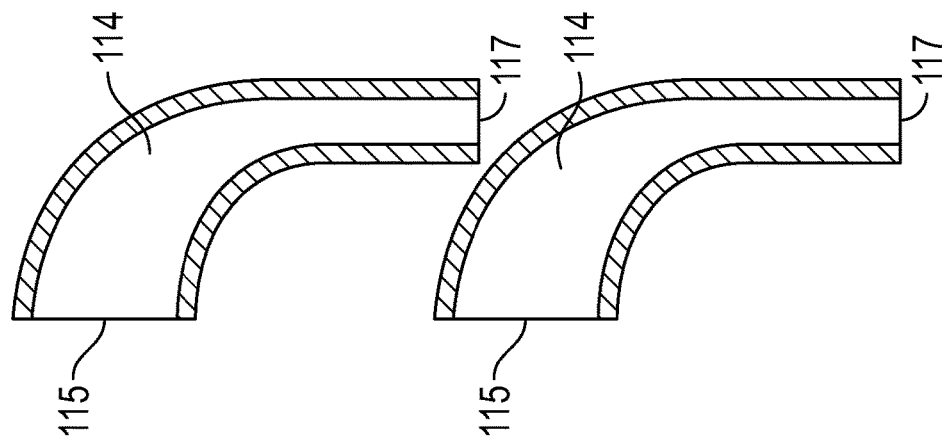
FIG. 1C, shows a top-down view of two adjacent passageways of the TOBI of FIG. 1A.
Figure 1B:
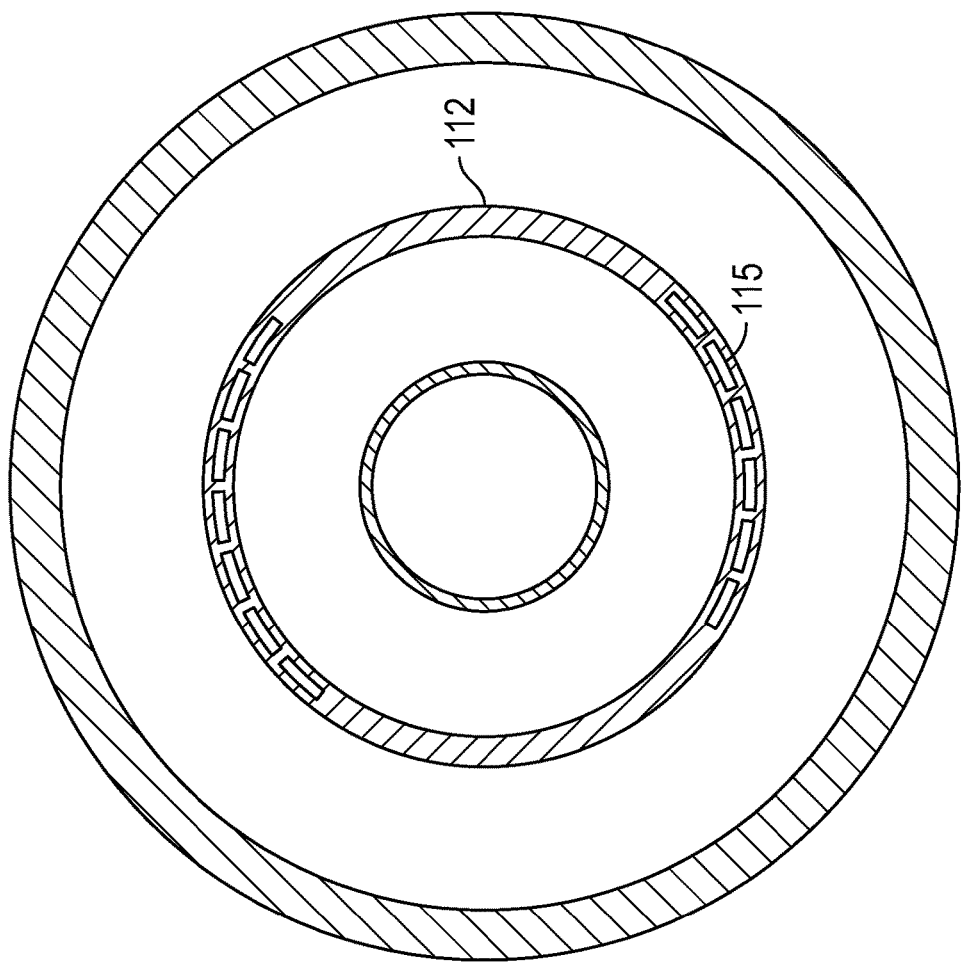
FIG. 1B is a baseline view of the TOBI of FIG. 1A.

FIG. 1B is a baseline view of the TOBI of FIG. 1A. As shown, a plurality of entrances 115 may be formed in the body 112 of the TOBI. Although shown with entrances 115 covering 180° of the body 112 of the TOBI, those of skill in the art will appreciate that entrances 115 may cover the full 360° of the body of the TOBI, or other configurations may be employed. FIG. 1C, shows a top-down view of two adjacent passageways 114 of the TOBI.

In a conventional gas turbine engine, the configuration in FIGS. 1A-1C provide provides a flow metered by a static flow area with a predetermined tangential ejection angle relative to a rotor speed and current core flow rate through the TOBI. The static flow through the TOBI induces a monolithic pressure drop of the cooling flow it supplies to the airfoils downstream of the TOBI. The pressure ration between the location just after ejection form the TOBI to a mid-span of the airfoil a driving potential of cooling flow for the airfoil. For configurations utilizing a Variable Area Turbine ("VAT"), changes in vane area upstream of the airfoil can induce large fluctuations in the pressure ratio. The shifts in cooling pressure ration can impact back-flow-margin (e.g., an ability of a coolant to exit surface ejection holes) or a coolant flow rate to the airfoil. As provided herein, an adjustable TOBI (e.g., area changing) is provided to improve efficiency and/or operation of VAT in gas turbine engines.

Advantageously, TOBIs as provided herein may minimize losses coming on board to the blade by modulating the TOBI in such a way that an angle of the TOBI may be changed or varied with the RPM of the turbine. For example, a wing flap design may be employed for the TOBI or parts thereof. In other configurations, all or any subset of TOBI vanes may be rotated about a pivot. The TOBI vanes may be configured to define the passageways of the TOBI.

Figure 2:
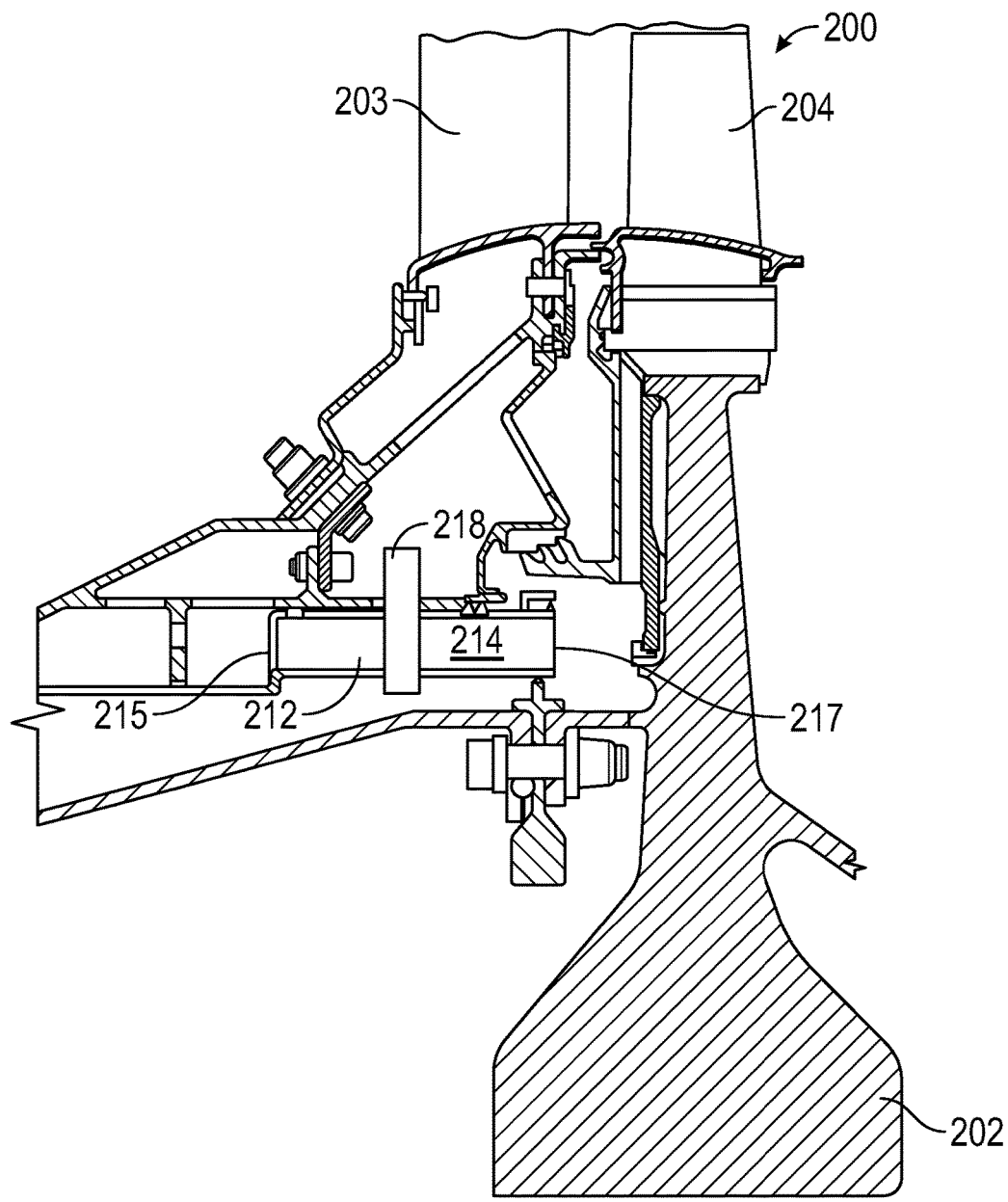
FIG. 2 is a side-view schematic illustration of a turbine of a gas turbine engine having a TOBI in accordance with an embodiment of the present disclosure.

Turning now to FIG. 2, a cross-sectional view of a turbine 200 having a TOBI configuration in accordance with an embodiment of the present disclosure is shown. As shown, the turbine 200 is substantially similar to the turbine 100 of FIG. 1, and thus similar features will not be discussed again. In the configuration of FIG. 2, the turbine 200 includes a disk 202 with a blade 204 supported thereon.

A TOBI is configured upstream of the disk 202 and is configured to direct air flow toward the disk, as described above. Similar to the TOBI described above, a body 212 is provided defining a TOBI passageway 214 with an entrance 215 and an exit 217. In this embodiment, the TOBI is further configured with a TOBI pivot 218. The TOBI pivot 218 may be operably and/or functionally part of and/or connected to a TOBI strut that formed at least one wall of the TOBI that defines the passageway 214. As such, a rotating vane or strut of the TOBI is provided such that may be rotatable about the TOBI pivot 218 such that the direction of air flowing through the TOBI may be controlled and/or adjusted.

In some embodiments, the TOBI pivot 218 may be operably connected to a vane 203 of the turbine 200, which may be radially above the TOBI within the turbine 200 and upstream of the blade 204. For example, in a non-limiting example, actuation of the adjustable TOBI may be accomplished through a rotary linkage that actuates each of the vanes rotated by a hard connecting rod coming down from the case of the engine. Other types of connectors and/or actuators may be used without departing from the scope of the present disclosure.

Turning now to FIGS. 3A-3C, various plan view schematic illustration of a plurality of adjustable struts 320 of a TOBI are shown. Each of the adjustable struts 320 includes a pivot 318 about which the adjustable strut 320 may be rotated. As shown, a non-rotatable, fixed, or stationary strut 322 is position or located between two adjacent adjustable struts 320. Thus, a repeating pattern of adjustable struts 320 and stationary struts 322 may be provided. Although shown with every other strut configured as a rotatable strut 320, various other configurations and/or patterns may be employed without departing from the scope of the present disclosure. Between two adjacent struts (one rotatable strut 320 and one stationary strut 322) is a passageway 314 through which air may pass and be directed by the struts 320, 322, passing from an inlet 315 to an outlet 317.

FIG. 3A shows the struts 320, 322 in a neutral position, where in each passageway 314 defines a similar size volume. Further, each inlet 315 and each outlet 317 of the TOBI is similar.

FIG. 3B shows the adjustable struts 320 moved or rotated into a closed position. The closing of the adjustable struts 320 may be prompted and/or controlled by rotation of vanes of a turbine. As shown, the volume of the passageways 314 may change. For example, the entrance 315 and the exit 317 of the passageway 314 may be changed due to the rotation of the adjustable struts 320 about the pivot 318. In the closed position, various exits 317 of the TOBI may be lessened in size, thus restricting an airflow through the TOBI.

FIG. 3C shows the adjustable struts 320 moved or rotated into an open position. Similar to the closed position, the volume of the passageway 314 may be altered and the entrance 315 and the exit 317 may be changed. In the open position, various exits 317 of the TOBI may be increased in size, thus increasing an airflow volume through the TOBI.

The adjustment of the adjustable struts, as provided herein, may adjust a volume defined by the TOBI. However, adjustment of the adjustable struts may provide, in combination or alternatively with volume adjustment, adjustment and/or control of airflow characteristics, include, but not limited to, velocity, airflow direction, etc., and thus the present disclosure is not limited to changes in volume alone.

As shown in FIGS. 3A-3C, the pivot 318 may be located at a particular position along the length of the adjustable strut 320. However, the position may be different for different configurations of adjustable struts. For example, the pivot location may be closer to one end or another end of the adjustable strut to achieve a desired movement and adjustment of the adjustable strut to provide a desired air flow control through the TOBI. Further, as shown in the configuration of FIGS. 3A-3C, the entire adjustable strut 320 is movable or adjustable, however, the present disclosure is not limited thereto.

For example, although shown and described above as a pivot, various other configurations are possible. In some non-limiting embodiments, a hinged adjustable strut of a TOBI may be provided. In some embodiments, the hinged portion may be controlled by mechanical and/or electrical controls and/or linkages.

Figure 4A:
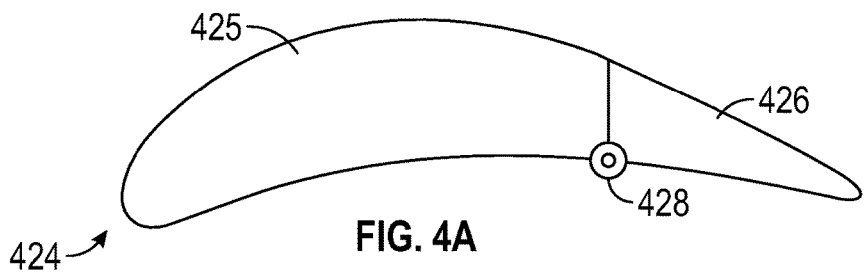
FIG. 4A is a schematic illustration of an alternative configuration of an adjustable strut for a TOBI in accordance with the present disclosure.
Figure 4B:
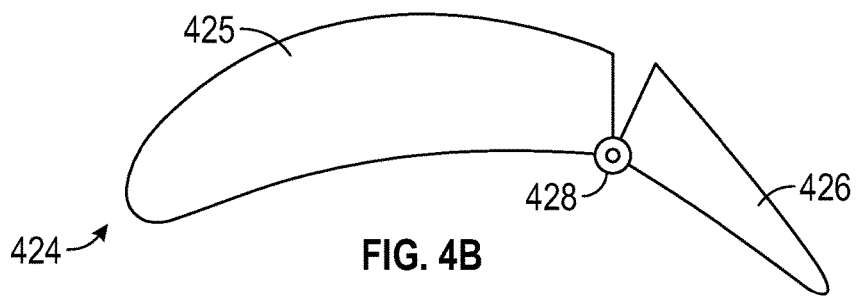
FIG. 4B is a schematic illustration of the adjustable strut of FIG. 4A adjusting toward a closed position.
Figure 4C:
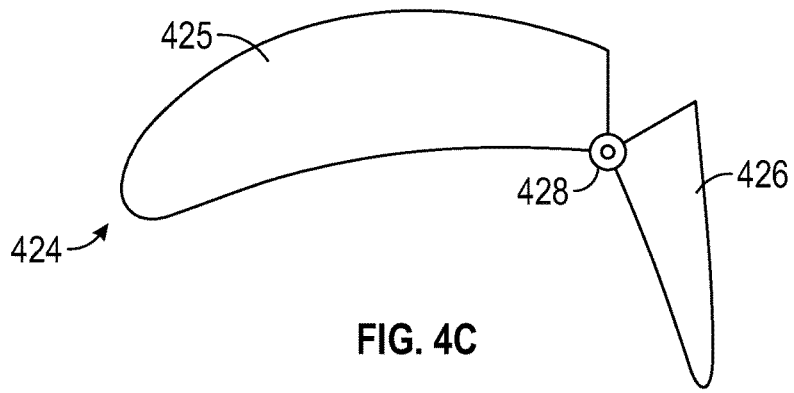
FIG. 4C is a schematic illustration of the adjustable strut of FIG. 4A in a closed position.

For example, turning to FIGS. 4A-4C, an alternative configuration of an adjustable TOBI is shown. FIGS. 4A-4C show various views of a single adjustable TOBI strut 424. The adjustable strut 424 includes a fixed portion 425 and a flap portion 426 that may be rotatable about a hinge 428 or other pivot or structure relative to the fixed portion 425. The length of the flap portion 426 may be configured to achieve a desired air flow and/or airflow restriction when in operation. FIGS. 4A-4C show a progression of the flap portion 426 of the adjustable strut 424 adjusting from a neutral state (FIG. 4A) to a closed state (FIG. 4C).

Although shown with a single hinge 428, those of skill in the art will appreciate that an adjustable strut as provided herein may be configured with double hinges. As such, in some embodiment, the flap portion of an adjustable strut of a TOBI may be able to adjust from a neutral position to a closed position (e.g., FIGS. 4A-4C) or may be able to adjust from the neutral position to an open position, such that the flap portion is hinged on the opposite side than that shown in FIGS. 4A-4C.

As will be appreciated by those of skill in the art, the relative sizes of the fixed portion 525 and the flap portion 426 may be selected to achieve a desired airflow control through a TOBI. Thus, in some embodiments, the flap portion may form only a small percentage of the adjustable strut.

Figure 5:
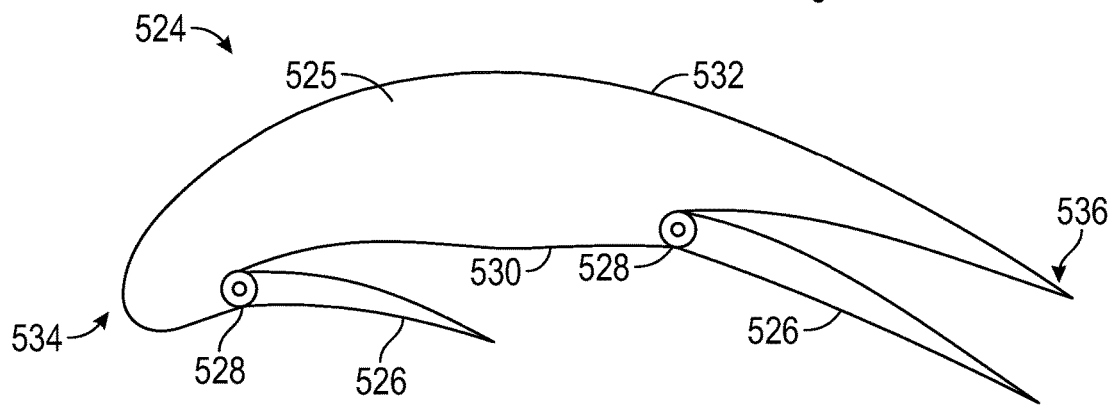
FIG. 5 is a schematic illustration of another configuration of an adjustable strut for a TOBI in accordance with an embodiment of the present disclosure.

Turning now to FIG. 5, another alternative configuration of an adjustable TOBI strut 524 is shown. In FIG. 5, the adjustable strut 524 includes a fixed portion 525 and two flap portions 526. Each flap portion 526 may be configured with a pivot or other hinge 528. As shown, the flap portions 526 are configured on a suction side 530 of the adjustable TOBI strut 524. A suction side 532 may extend a complete length of the adjustable strut 524, from a first end 534 to a second end 536. The flap portions 526 may be operable in tandem or independently of each other to achieve desired airflow control through an associated TOBI to which the adjustable strut 524 is a part.

On the pressure side 530, the flap portions 526 may form a portion of the length of the pressure side 530. However, in some non-limiting embodiments, the flap portion 526 may form the entire pressure side 530 and may be adjustable or movable relative to a fixed portion that forms a suction side extending from the first end to the second end.

Advantageously, embodiments described herein provide an adjustable TOBI for an aircraft turbine and/or engine.

Adjustable struts of the TOBI may enable improved part life and/or improved engine efficiency through control of airflow through the TOBI.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions, combinations, sub-combinations, or equivalent arrangements not heretofore described, but which are commensurate with the scope of the present disclosure. Additionally, while various embodiments of the present disclosure have been described, it is to be understood that aspects of the present disclosure may include only some of the described embodiments.

For example, although various shapes and configurations of adjustable struts for TOBIs are shown and described, those of skill in the art will appreciate that the shapes, sizes, adjustable/movable parts, etc. may be varied or modified as desired without departing from the scope of the present disclosure.

Accordingly, the present disclosure is not to be seen as limited by the foregoing description, but is only limited by the scope of the appended claims.

What is claimed is:

1. A tangential on-board injector (TOBI) for a gas turbine engine, the TOBI comprising:
    at least one adjustable strut configured to control an airflow through the TOBI, the at least one adjustable strut moveable to change an airflow characteristic within the TOBI,
    wherein the at least one adjustable strut is operably connected to a vane of the gas turbine engine, wherein operation of the operably connected vane causes adjustment of the at least one adjustable strut.

2. The tangential on-board injector of claim 1, wherein the at least one adjustable strut comprises a body and at least one pivot, wherein the body is configured to rotate about the at least one pivot.

3. The tangential on-board injector of claim 1, wherein the at least one adjustable strut comprises a body defining a fixed portion and at least one flap portion, wherein the at least one flap portion is moveable relative to the body.

4. The tangential on-board injector of claim 3, wherein the at least one flap portion is moveable on a hinge.

5. The tangential on-board injector of claim 3, wherein the body has a suction side and a pressure side, wherein the at least one flap portion is located on the pressure side of the body.

6. The tangential on-board injector of claim 3, wherein the body has a suction side and a pressure side, wherein the at least one flap portion is located on the suction side of the body.

7. The tangential on-board injector of claim 3, wherein the at least one flap portion comprising at least two flap portions.

8. The tangential on-board injector of claim 7, wherein the at least two flap portions are configured to move independently of each other.

9. A gas turbine engine comprising:
    a tangential on-board injector (TOBI) having:
        a plurality of adjustable struts configured to control an airflow through the TOBI, each adjustable strut moveable to change an airflow characteristic within the TOBI, and
        a plurality of stationary struts,
        wherein the plurality of adjustable struts are configured to alternate within the TOBI with the plurality of stationary struts.

10. The gas turbine engine of claim 9, wherein the at least one adjustable strut comprises a body and at least one pivot, wherein the body is configured to rotate about the at least one pivot.

11. The gas turbine engine of claim 9, wherein the at least one adjustable strut comprises a body defining a fixed portion and at least one flap portion, wherein the at least one flap portion is moveable relative to the body.

12. The gas turbine engine of claim 11, wherein the at least one flap portion is moveable on a hinge.

13. The gas turbine engine of claim 11, wherein the body has a suction side and a pressure side, wherein the at least one flap portion is located on the pressure side of the body.

14. The gas turbine engine of claim 11, wherein the body has a suction side and a pressure side, wherein the at least one flap portion is located on the suction side of the body.

15. The gas turbine engine of claim 11, wherein the at least one flap portion comprising at least two flap portions.

16. The gas turbine engine of claim 15, wherein the at least two flap portions are configured to move independently of each other.

17. The gas turbine engine of claim 9, wherein the at least one adjustable strut is operably connected to a vane of the gas turbine engine, wherein operation of the operably connected vane causes adjustment of the at least one adjustable strut.

18. A method of manufacturing a gas turbine engine having a tangential on-board injector (TOBI) the method comprising:
    operably connecting at least one adjustable strut to a vane of the gas turbine engine, the at least one adjustable strut configured to control an airflow through the TOBI, the at least one adjustable strut moveable to change an airflow volume within the TOBI,
    wherein operation of the operably connected vane causes adjustment of the at least one adjustable strut.

* * * * *